Figure 4:
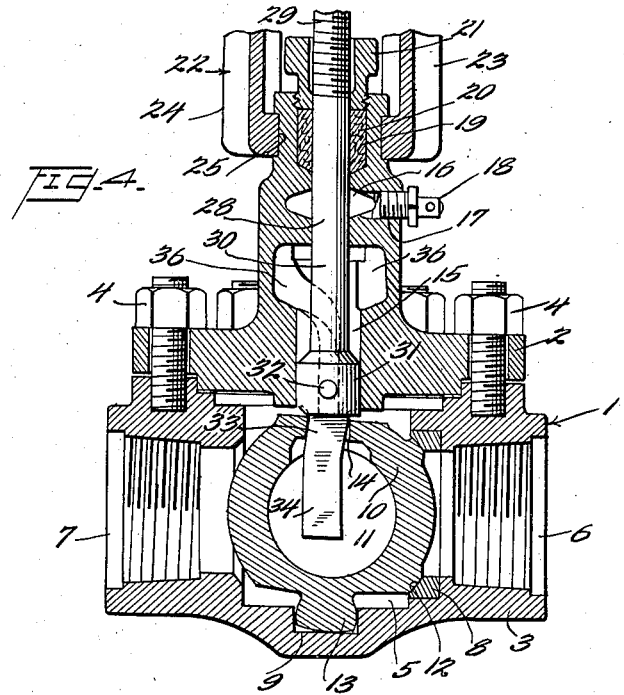

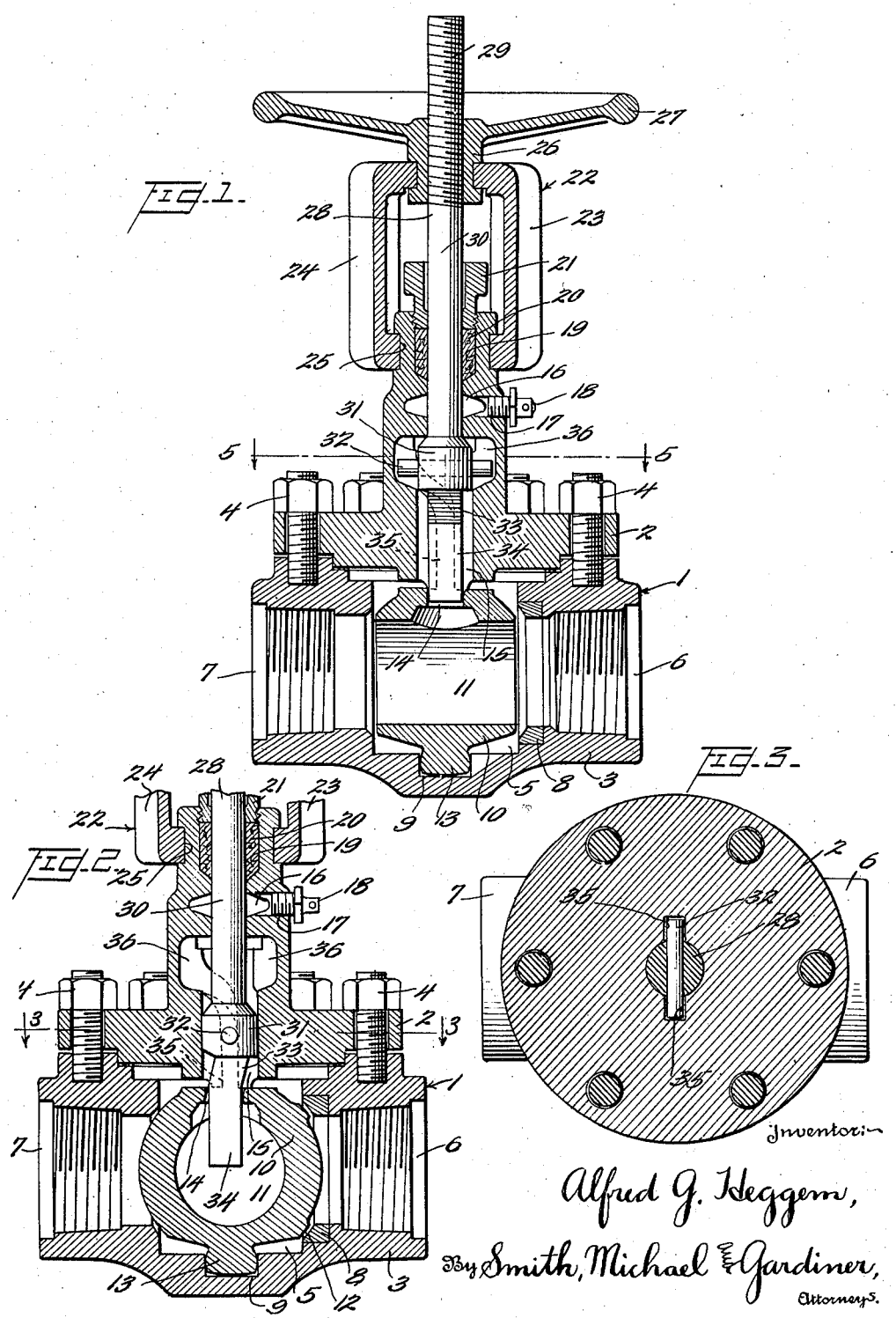

April 13, 1937.　　　A. G. HEGGEM　　　2,076,841
VALVE
Filed Dec. 19, 1936　　　2 Sheets-Sheet 2

Inventor:—
Alfred G. Heggem,
By Smith, Michael & Gardiner,
Attorneys.

Patented Apr. 13, 1937

2,076,841

UNITED STATES PATENT OFFICE 2,076,841

VALVE

Alfred G. Heggem, Tulsa, Okla., assignor of one-third to Ed D. Ligon and one-third to William O. Ligon, both of Tulsa, Okla.

Application December 19, 1936, Serial No. 116,793

8 Claims. (Cl. 251—91)

My invention relates to valves, and has particular reference to a novel valve construction in which a valve core or fluid controlling member is rotated and also rocked or tilted within a valve body during the movements of said valve core or member to open and/or closed position.

In United States Letters Patent 1,989,009 granted to me under date of Jan. 22, 1935, and in several applications now pending in the United States Patent Office, such as my applications Serial No. 9,115 filed March 2, 1935; Serial No. 48,737 filed Nov. 7, 1935 and Serial No. 48,738 filed Nov. 7, 1935, I have disclosed and claimed a novel valve construction including a valve body having inlet and outlet openings and a valve chamber communicating with said openings; a valve core disposed within the chamber and rotatable therein; a valve stem rotatable with respect to the valve body; and means controlled by the rotation of the valve stem for alternately rotating and tilting the valve core. The combined rotating and tilting action of the valve core as presented in my aforesaid patent and applications, constitutes an important development in the art of valve constructions, and affords a highly efficient and reliable means for controlling the flow of fluids, due to the ease of rotation of the valve core and the positive sealing or seating action effected by the tilting movement of the valve core into contact with its cooperating valve seat. Valves of this general type in which the valve core or fluid-controlling member partakes of a compound motion of rotative and non-rotative movements sequentially or alternately, provide a highly satisfactory and efficient means for controlling fluid flow, and such a valve is especially suitable for use in the control of fluids operating under relatively high pressures, such as the pressures frequently encountered in oil and gas wells, pipe lines and other high pressure installations.

The principal object of my present invention is to provide a novel valve construction of the above-mentioned character in which the sequential and alternate rotative and non-rotative movements of the valve core are effected by means which are materially simplified with respect to the means shown in my aforesaid patent and applications, which simplicity and reduction in the number of parts in no way detracts from the effectiveness or efficiency of the valve.

It is an object of my present invention to provide a valve construction of the above-mentioned character and including a combined rotating and tilting valve core, and to associate with said valve core a novel and simple operating means actuated by the rotation of the valve handle, for sequentially effecting the alternate rotation and tilting of the valve core with respect to its cooperating valve seat.

It is an object of my present invention to provide a novel and simple operating means interposed between the valve handle and valve core to effectively transmit the motion of said valve handle to said valve core to cause an initial tilting of the valve core away from its cooperating valve seat and a subsequent rotation of the valve core to aline the opening therethrough with the inlet and outlet openings in the valve body as the said valve core is moved to open position, and, when the valve handle is moved in the opposite direction to close the valve, to cause an initial rotation of the valve core to move the opening therethrough out of alinement with the inlet and outlet openings in the valve body and a subsequent tilting of the valve core to move the flow-restricting portion thereof into firm and positive engagement with the cooperating valve seat.

It is a further object of my present invention to provide a novel operating mechanism of the type above referred to for alternately rotating and tilting the valve core about its mounting in the valve chamber, and including a valve stem of simple form capable of rotary and axial movements, rotation of the valve stem effecting a corresponding rotation of the valve core and axial movement of said valve stem effecting tilting movement of said valve core toward or away from its cooperating valve seat, the said valve stem having inclined surfaces which engage the said valve core and having a connection with the valve casing, the construction and assembly being such that the inclined surfaces on the valve stem will effect tilting movement of the valve core upon axial movement of said valve stem, and the connection between the valve stem and valve casing will effect rotary movement of the valve stem and the valve core to which it is connected.

It is a still further object of my present invention to provide a valve of the above mentioned character which is simple in construction and operation, easy to assemble and disassemble, strong and durable, capable of withstanding relatively high pressures, and highly efficient in the purposes for which designed.

Figure 5:
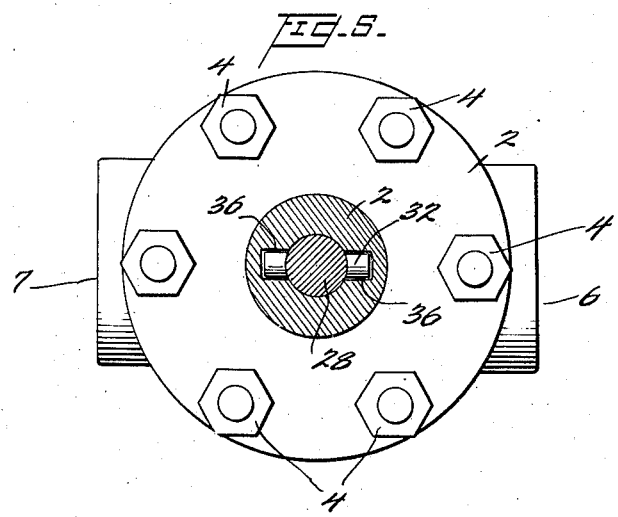

In the accompanying drawings forming a part of this specification and wherein, for the purpose of illustration, I have shown a preferred embodiment of my invention, Figure 1 is a central, vertical sectional view of a valve embodying the features of my present invention and showing the valve core in open position, Figure 2 is a fragmentary, central, vertical, sectional view of the valve illustrated in Fig. 1 and showing the valve core after it has been rotated toward closed position but before the valve core has been tilted to force the said core into firm and positive contact with the cooperating valve seat, Figure 3 is a transverse sectional view on the line 3—3 of Figure 2, Figure 4 is a fragmentary, central, vertical sectional view of the valve shown in Figs. 1 and 2, showing the relation of parts when the valve core has been rotated and tilted to fully closed position, and, Figure 5 is a transverse sectional view on the line 5—5 of Figure 1.

In the accompanying drawings wherein like reference characters have been employed to designate like parts throughout the several views, the numeral 1 designates, broadly, the valve body, comprising an upper section 2 and a lower section 3, which sections are detachably secured together by a series of studs, bolts or nuts 4. The lower section 3 of the valve body is provided with a circularly-curved chamber 5, communicating with which are passages 6 and 7 for the outflow and inflow, respectively, of the fluid to be controlled by the valve. These passages 6 and 7 are disposed in axial alinement and are preferably interiorly threaded to permit the valve to be screwed on to a well casing, pipe or the like, this construction, because of the axial alinement of the inlet and outlet passages and the construction of the preferred form of valve core to be hereinafter described, being admirably suited for use as a well casing valve, where it is frequently desired to operate the bits or other drilling or pumping tools directly through the valve and without the necessity of removing the valve from the casing. The outlet passage 6 is preferably provided with a machined, valve seat insert 8 positioned at the inner end of said passage. The wall defining the bottom of the chamber 5 is provided with a centrally-located, circular recess 9.

The chamber 5 within the lower section 3, is open at the top to permit the introduction of a valve core 10, which core is formed with a passage 11 cylindrical throughout its length and of a diameter corresponding substantially to that of the passages 6 and 7 of the valve body so as to afford a straight, uninterrupted passage for fluid when the valve is in open position. One of the flat, imperforate side portions of the valve core 10 is machined to form a tapered valve face 12, which valve face is of sufficient extent to border the inner margin of the passage 6 and is so machined as to cooperate with the valve seat 8 to effect a fluid-tight seal or closure when said face is moved into firm contact with said seat. The lower surface of the valve core 10 is provided with a centrally-located trunnion 13, the outer face of which is slightly curved, this trunnion fitting into the recess 9. The upper surface of the valve core 10 is provided with a centrally-located, non-circular, preferably squared opening 14, disposed in axial alinement with the trunnion 13. It is to be noted particularly that the overall length of the valve core 10, in a direction parallel to the axis of the passage 11 therethrough, i. e., as viewed in Fig. 1 of the accompanying drawings, is less than the diameter of the chamber 5 and slightly less than the distance between the opposed inner ends of the outlet passage 6 and the inlet passage 7. Hence, the valve core 10 may be readily inserted within and removed from the chamber 5 through the upper open end thereof.

The valve core 10 above described is rotatable with respect to the valve body 1 so as to bring its passage 11 into and out of axial alinement with the passages 6 and 7 of the valve body, and said core is also capable of tilting or rocking about its vertical axis so as to cause the tapered valve face 12 to move into and out of tight sealing contact with the valve seat 8 at the inner end of the outlet passage 6 of the valve body. My present invention relates primarily to the mechanism for effecting the aforesaid rotary and tilting movements of the valve core 10 as the said valve core is moved to open or closed position.

The upper section 2 of the valve body 1 is provided with a centrally-located bore or chamber 15, circular in cross section and of substantial length, it being noted that when the sections 2 and 3 are assembled, the axis of the said bore or chamber 15 is in vertical alinement with the axis of rotation of the valve core member 10, which axis of rotation passes through the center of the trunnion 13 and through the square opening 14 in the top of the valve core 10. Above the bore or chamber 15 just referred to, I provide a grease compartment 16, which compartment is supplied with lubricant through an opening 17 provided with a grease gun fitting 18. Above the grease compartment 16 and extending through the upper end of the section 2, I provide a packing socket 19 containing a suitable packing 20 adapted to be compressed within said socket by means of a nut or screw-threaded follower 21.

Surrounding the upper end of the section 2 is an upwardly extending, vertically split, two part support or spider 22, comprising two similar sections 23 and 24, each provided with cooperating, apertured lugs or projections (not shown) through which are passed suitable clamping bolts by means of which the two sections are rigidly clamped together to retain the said support or spider 22 in position within a circumferentially extending groove 25 provided on the upper end of the section 2. The upper end of the support or spider 22 is apertured to provide a bearing for a sleeve 26 constituting the hub portion of a valve-wheel or handle 27, this sleeve or hub 26 being internally screw-threaded and being free to rotate within the said support or spider 22.

The valve stem 28 which functions to effect by its reciprocation, the rotation and rocking or tilting movements of the valve core 10, comprises an externally-threaded upper section 29, the threads of which cooperate with the internal threads of the hub portion 26 of the valve-wheel or handle 27; a straight, cylindrical section 30; an enlarged, cylindrical land section 31 of a diameter slightly less than the diameter of the bore or chamber 15; a transverse pin 32; and a non-circular, preferably squared lower section including an inclined portion 33 immediately below the land section 31, and a straight portion 34, which straight portion 34 is, due to the inclined portion 33, offset laterally with respect to the vertical axis of the remaining sections of the valve stem. The preferably squared portions 33 and 34 are of a dimension such that they are freely insertable through the opening 14 in the upper surface of the valve core 10, and the surfaces of said portions slidably engage the walls defining the said opening, it being obvious that as the valve stem 28 is rotated in a manner to be hereinafter described, such rotation of the valve stem will be transmitted to the valve core to rotate the same, and that reciprocation of the valve stem 28 will cause the inclined surfaces of the section 33 of said valve stem to engage the opposite walls defining the opening 14 to rock or tilt said valve core about the trunnion 13 into and out of contact with the valve seat 8.

As a novel and effective means for converting a portion of the reciprocating movements of the valve stem 28 into a partial rotary movement, I cut into the wall defining the bore or chamber 15, a pair of diametrically-opposed grooves or slots, each of which includes a lower straight and vertical portion 35 and an upper curved or short-spiralled portion 36, the distance between the opposed bottom walls defining these two grooves, being slightly greater than the length of the pin 32, and the width of each of said grooves being slightly greater than the diameter of the said pin. The upper end of each of the groove portions 36 is disposed in a vertical plane positioned approximately ninety degrees with respect to a vertical plane including the straight portions 35, and, hence, as the pin 32 moves from the upper ends of the groove portion 36 to the straight portions 35, or from the straight portions 35 to the upper ends of the groove portions 36, it will be obvious that the valve stem 28 is rotated a quarter of a turn, i. e., through an arc of ninety degrees.

Referring now to the manner of assembling the various component parts above described, the first step of such assembly consists in inserting the valve core 10 within the valve chamber 5 with the trunnion 13 disposed within the recess 9 and with the flow passage 11 through the valve core 10 alined with the passages 6 and 7. The valve stem 28 is then inserted through the lower, open end of the bore or chamber 15 in the valve body or casing section 2 and is pushed upwardly until the pin 32 is disposed near the upper end of the groove portions 36. Packing 20 is then placed within the packing socket 19 and the follower 21 is screwed down into the socket to compress the said packing into fluid-tight contact with section 30 of the valve stem. A pressure grease gun is then applied to the fitting 18 and the grease compartment 16 filled with lubricating grease under pressure, which grease gradually works up and down along the valve stem to properly lubricate the said valve stem. The valve wheel or handle 27 is then screwed onto the threaded section 29 of the valve stem, and the two-part support or spider 22 is bolted together so that its lower portion engages within the groove 19 and its upper portion engages within the groove in the hub portion 26 of the valve-wheel or handle 27. The upper section 2 of the valve body or casing 1 is then superimposed upon the lower valve body or casing section 3 with the lowermost end of the straight, squared portion 34 of the valve stem passing through the opening 14 in the upper surface of the valve core 10. The studs or bolts 4 are then applied to rigidly maintain the sections 2 and 3 in assembled relation.

Referring now to the operation of the valve construction described in detail above, and assuming that the valve is in open position as shown in Fig. 1 of the accompanying drawings, rotation of the valve-wheel or handle 27 in a clockwise direction will cause the valve stem to move downwardly toward the valve core, which downward movement will cause the pin 32 to follow the curved or spiralled groove portion 36, thus rotating the valve stem 28 through an arc of ninety degrees. Due to the non-rotative but slidable connection between the lower, squared end 34 of the valve stem and the valve core, this quarter revolution of the valve stem 28 will cause a quarter revolution of the valve core 10, thus moving the valve core 10 from the position shown in Fig. 1 to the position shown in Fig. 2. When the valve core reaches the position shown in Fig. 2, it will be obvious that continued downward movement of the valve stem effected by the rotation of the valve-wheel or handle 27, will cause the inclined surfaces of the valve stem section 33 to engage the opposed walls defining the opening 14 in the upper surface of the valve core 10, this continuous downward movement of the stem being effective, through the provision of the inclined section 33, to rock the valve core 10 about its trunnion 13 to thus force the valve face 12 into firm sealing or seating contact with the valve seat 8, whereupon the valve is fully closed and the component parts thereof assume the positions shown in Fig. 4.

It is to be particularly noted that during the downward movement of the valve stem 28, the engagement between the pin 32 and the groove or slot portions 35 and 36 definitely controls the movements of the valve stem and the valve core actuated thereby, i. e., the pin 32 in moving from the upper end of the groove or slot portion 36 to the upper end of the straight groove or slot section 35, causes the valve stem to rotate a quarter turn. When this quarter turn of the valve stem and valve core has been completed, the pin 32 is located at the top of the straight groove or slot portion 35 and this engagement between the said pin and said straight groove or slot portion 35 definitely prevents further rotation of the valve stem and valve core but permits said valve stem to move toward the valve core to effect the tilting or rocking movement thereof.

When it is desired to open the valve to permit the flow of fluid therethrough, i. e., when it is desired to move the valve from the closed position shown in Fig. 4 to the open position shown in Fig. 1, a counterclockwise rotation is imparted to the valve-wheel or handle 27, which causes the valve stem 28 to rise. During the initial upward movement of the valve stem, the engagement between the inclined surfaces of the stem section 33 and the walls defining the opening 14, will cause the valve core 10 to tilt or rock away from the valve seat 8, it being noted that during this initial upward movement of the valve stem, the pin 32 is disposed within the straight groove portion 35 and, hence the valve stem is held against rotation. The valve core then occupies the position shown in Fig. 2. Continued upward movement of the valve stem 28 causes the pin 32 to enter the curved or spiralled groove portion 36 and, hence, the valve stem will be rotated a quarter turn, thereby causing the valve core to move to open position, i. e., to the position shown in Fig. 1. It will be noted that the extent of the vertical movements of the valve stem are determined by contact of the land section 31 with the end wall of the bore or chamber 15, as seen in Fig. 1, and with the top surface of the valve core as seen in Fig. 4.

It will be noted from the above description of construction and operation that throughout the entire cycle of operation of the valve, the movements of the valve stem and valve core are so timed that they occur at relatively fixed positions. This is an important feature, as it permits the opening and closing movements to be reversed at any stage without interfering with the effective functioning of the several parts. Thus the valve core 10 may be released from sealing or seating contact with the valve seat 8 and then, by a reversal of the rotation of the valvewheel or handle 27, immediately forced again into contact therewith, thereby permitting the "cracking" of the valve to any degree. The valve of my present invention is notable for its extreme simplicity of construction and operation, it being noted that there are only three moving parts, i. e., the valve core, the valve stem and the valve wheel or handle.

It is to be understood that the form of my invention shown and described herein is to be taken as a preferred embodiment of the same and that various changes may be made in the size, shape and arrangement of parts without departing from the spirit of my invention or the scope of the subjoined claims. For example, it will be obvious to one skilled in the art that means other than a rotary hand wheel could readily be employed to effect the vertical movements of the valve stem; that a pair of opposed grooves could be provided on the valve stem and that pins or other projections could be provided on the valve section 2; that the specific form of the two-part valve body could be readily charged or modified; and that other obvious changes can be made in the device, which would provide a valve construction embodying the essential features of my present invention.

Having thus described my invention, I claim:

1. A valve comprising a valve body having an inlet and an outlet opening and a valve chamber communicating with said openings; a valve core journaled within said chamber for rotary and tilting movements therein, said valve core having a non-circular opening through a wall thereof; a valve stem having a non-circular section slidably engaging the walls defining the opening in the valve core, said non-circular section including a straight walled portion and a portion having opposed walls inclined with respect to the axis of rotation of the valve core; and means for rotating and reciprocating the valve stem, rotation of the valve stem causing a corresponding rotation of the valve core, and the sliding engagement between the inclined portion of said valve stem and the walls defining the opening in said valve core causing the valve core to tilt about an axis transverse to the axis of rotation of said valve core.

2. A valve comprising a valve body having an inlet and an outlet opening and a valve chamber communicating with said openings; a valve core journalled within said chamber for rotary and tilting movements therein; a valve stem non-rotatably engaging the valve core and movable axially with respect thereto; a pin and helical slot connection between said valve stem and valve body for converting a portion of the axial movement of the valve stem into rotary movement, rotation of the valve stem effecting a corresponding rotation of the valve core; an inclined surface on the valve stem adapted to engage the valve core during axial movement of the valve stem for causing a portion of the axial movement of said valve stem to tilt the valve core into contact with said valve body around one of said openings; and means for moving said valve stem axially.

3. A valve comprising a valve body having an inlet and an outlet opening and a valve chamber communicating with said openings; a valve seat surrounding one of said openings; a valve core journaled within said chamber for rotary and tilting movements therein; a valve stem non-rotatably engaging the valve core and movable axially with respect thereto; a projection on said valve stem; a groove in said valve body for engagement by said projection and comprising a straight portion and a helical portion; means for moving said valve stem axially, the engagement between the projection and straight portion of said groove causing straight axial movement of said valve stem, and the engagement between said projection and helical portion of said groove causing said valve stem and the valve core to rotate; and an inclined surface on the valve stem adapted to engage the valve core during axial movement of the valve stem during the period when the projection is engaged within the straight portion of said groove for causing straight axial movement of said valve stem to tilt said valve core into contact with said valve seat.

4. A valve comprising a valve body having an inlet and an outlet opening and a valve chamber communicating with said openings; a valve core journaled within said chamber for rotary and tilting movements therein; a valve seat surrounding one of said openings; a valve stem movable axially with respect to the valve core, said valve stem comprising a straight upper portion, an intermediate portion having substantially parallel, opposed walls inclined with respect to the axis of the valve stem, and a straight lower portion extending axially of the valve stem, said intermediate and lower straight portions non-rotatably engaging said valve core; a transverse pin projecting from opposite sides of the upper straight portion of said valve stem; a pair of similar, opposed grooves in said valve body for engagement by said pin, each groove comprising a straight portion and a helical portion; and means for moving said valve stem axially, the engagement between said pin and the straight portions of said grooves causing straight axial movement of said valve stem, the engagement between said pin and the helical portions of said groove causing said valve stem and the valve core to rotate, the engagement between one inclined wall of the intermediate portion of said valve stem and the valve core causing the straight axial movement of said valve stem to tilt said valve core into contact with said valve seat during movement of said valve stem in one direction, and the engagement between the other inclined wall of the intermediate portion of said valve stem and the valve core causing the straight axial movement of said valve stem to tilt said valve core away from said valve seat during movement of said valve stem in the opposite direction.

5. A valve comprising a valve body having an inlet and an outlet opening and a valve chamber communicating with said openings; a valve core journaled within said chamber for rotary and tilting movements therein, said valve core having a non-circular opening through a wall thereof; a valve stem having a non-circular section slidably engaging the walls defining the opening in the valve core, said non-circular section including a straight walled portion and a portion having opposed walls inclined with respect to the axis of rotation of the valve core; a pin and helical slot connection between said valve stem and valve body for converting a portion of the axial movement of the valve stem into rotary movement, rotation of the valve stem causing a corresponding rotation of said valve core, and the sliding engagement between the inclined portion of said valve stem and the walls defining the opening in said valve core causing the valve core to tilt about an axis transverse to the axis of rotation of said valve core; and means for moving said valve stem axially.

6. A valve comprising a valve body having an inlet and an outlet opening and a valve chamber communicating with said openings; a valve core journaled within said chamber for rotary and tilting movements therein, said valve core having a non-circular opening through a wall thereof; a valve stem having a non-circular section slidably engaging the walls defining the opening in the valve core, said non-circular section including a straight walled portion and a portion having opposed walls inclined with respect to the axis of rotation of the valve core; a pin and helical slot connection between said valve stem and valve body, said slot comprising a straight portion and a helical portion; means for moving said valve stem axially, the engagement between the pin and the straight portion of the slot causing straight axial movement of the valve stem throughout the extent of relative axial movement between the inclined wall portions of the stem and the walls defining the opening in the valve core, the engagement between the pin and the helical portion of the slot causing said valve stem and the valve core to rotate, and the sliding engagement between the inclined portion of said valve stem and the walls defining the opening in said valve core causing the valve core to tilt about an axis transverse to the axis of rotation of said valve core; and means for moving said valve stem axially.

7. A valve comprising a valve body having an inlet and an outlet opening and a valve chamber communicating with said openings; a valve core journaled within said chamber for rotary and tilting movements therein, said valve core having a non-circular opening through a wall thereof; a valve stem, the lower end of which is non-circular in cross-section and has sliding, non-rotary engagement with the walls defining the opening in the valve core, said end comprising a straight walled portion offset laterally with respect to the remainder of the stem and a portion having opposed walls inclined with respect to the axis of said stem; and means for rotating and reciprocating the valve stem, the rotation of the valve stem causing a corresponding rotation of the valve core when the straight walled portion of the stem is in engagement with the walls defining the valve core opening, and the sliding engagement between the inclined portion of the stem and the walls defining said opening causing the valve core to tilt about an axis transverse to the axis of rotation of said valve core.

8. A valve comprising a valve body having an inlet and an outlet opening and a valve chamber communicating with said openings; a valve seat surrounding one of said openings, a valve core journaled within said chamber for rotary and tilting movements therein; a valve stem non-rotatably engaging the valve core and movable axially with respect thereto; a pin and helical slot connection between said valve stem and valve body, said slot comprising a straight portion parallel to the axis of rotation of the valve core and a helical portion terminating in a plane normal to a plane including the said straight portion; means for moving said valve stem axially, the engagement between the pin and straight portion of said slot causing straight axial movement of said valve stem, and the engagement between said pin and helical portion of said slot causing said valve stem and the valve core to rotate a quarter of a turn; and an inclined surface on said valve stem adapted to engage the valve core during engagement between the pin and straight portion of said slot for causing the straight axial movement of said valve stem to tilt said valve core into contact with said valve seat.

ALFRED G. HEGGEM.